(12) United States Patent
Hegemier et al.

(10) Patent No.: US 7,895,091 B2
(45) Date of Patent: Feb. 22, 2011

(54) ORDER FULFILLMENT AND CONTENT MANAGEMENT SYSTEMS AND METHODS

(75) Inventors: Darrin G. Hegemier, Del Mar, CA (US); Darryl R. Kuhn, La Jolla, CA (US)

(73) Assignee: Skinit, Inc., San Diego, CA (US)

( * ) Notice: Subject to any disclaimer, the term of this patent is extended or adjusted under 35 U.S.C. 154(b) by 0 days.

(21) Appl. No.: 11/935,382

(22) Filed: Nov. 5, 2007

(65) Prior Publication Data

US 2008/0154750 A1 Jun. 26, 2008

Related U.S. Application Data

(60) Provisional application No. 60/856,495, filed on Nov. 3, 2006, provisional application No. 60/941,628, filed on Jun. 1, 2007, provisional application No. 60/956,900, filed on Aug. 20, 2007.

(51) Int. Cl.
*G06Q 10/00* (2006.01)
*G06F 19/00* (2006.01)
*G06Q 30/00* (2006.01)

(52) U.S. Cl. .............................. 705/28; 700/97; 705/26

(58) Field of Classification Search .................. 700/97; 705/26; 709/220
See application file for complete search history.

(56) References Cited

U.S. PATENT DOCUMENTS

| | | | |
|---|---|---|---|
| 4,314,813 A | 2/1982 | Masaki | |
| 5,338,396 A | 8/1994 | Abdala et al. | |
| 6,228,451 B1 | 5/2001 | Boudouris et al. | |
| 6,312,124 B1 | 11/2001 | Desormeaux | |
| 6,543,893 B2 | 4/2003 | Desormeaux | |
| 6,670,015 B1 | 12/2003 | Hanson | |
| 6,977,023 B2 | 12/2005 | Abrams | |
| D522,064 S | 5/2006 | Trigg et al. | |
| D522,066 S | 5/2006 | Trigg et al. | |
| D523,090 S | 6/2006 | Trigg et al. | |
| 2002/0035408 A1* | 3/2002 | Smith | 700/97 |
| 2002/0093538 A1 | 7/2002 | Carlin | |
| 2003/0017848 A1 | 1/2003 | Engstrom et al. | |
| 2003/0069801 A1* | 4/2003 | Che-Mponda et al. | 705/26 |
| 2003/0182402 A1* | 9/2003 | Goodman et al. | 709/220 |

(Continued)

OTHER PUBLICATIONS

Skinit.com found in www.archive.org/index.php from Nov. 2005.*

(Continued)

*Primary Examiner*—F. Ryan Zeender
*Assistant Examiner*—Denisse Ortiz Roman
(74) *Attorney, Agent, or Firm*—Fitch Even Tabin & Flannery

(57) ABSTRACT

An order fulfillment and content management system and method configured to fulfill a product order for a customized adhesive cover ("skin"). In various embodiments, an order can be placed for a skin in an on-demand nature. In other words, a user can select and customize a skin over a network and the resulting skin is manufactured in accordance with that order. Furthermore, various processes can be integrated and moved in concert with one another to provide an efficient and timely fulfillment of the order. The system can also have several stake holders that can quickly review and identify any problems in an order and arrive at a quick resolution path.

14 Claims, 11 Drawing Sheets

U.S. PATENT DOCUMENTS

| | | |
|---|---|---|
| 2003/0195824 A1 | 10/2003 | Duffy et al. |
| 2003/0212610 A1 | 11/2003 | Duffy et al. |
| 2004/0215486 A1 | 10/2004 | Braverman |
| 2004/0236634 A1 | 11/2004 | Ruuttu |
| 2005/0116334 A1 | 6/2005 | Buehler |
| 2005/0271864 A1 | 12/2005 | Van Driesten et al. |
| 2006/0040081 A1 | 2/2006 | Hodsdon et al. |
| 2006/0062953 A1 | 3/2006 | Trigg et al. |
| 2006/0110565 A1 | 5/2006 | Tataryan et al. |
| 2006/0129461 A1 | 6/2006 | Pankl et al. |
| 2006/0154029 A1 | 7/2006 | Antonini |
| 2006/0240209 A1 | 10/2006 | Sano |
| 2006/0253214 A1 | 11/2006 | Gross |
| 2007/0021068 A1 | 1/2007 | Dewhurst |
| 2007/0065620 A1 | 3/2007 | Nonaka |
| 2008/0313552 A1 | 12/2008 | Buehler et al. |

OTHER PUBLICATIONS

International Search Report and Written Opinion for PCT/US07/83673, mailed Mar. 12, 2008, 7 pages.

International Search Report and Written Opinion for PCT/US07/83675, mailed on May 14 2008, 7 pages.

U.S. Appl. No. 11/726,960, filed Mar. 3, 2007.

U.S. Appl. No. 11/759,600, filed Mar. 3, 2007.

Decalgirl.com, "Xbox Skins ? Custom Xbox Skins and Xbox Stickers for Game Consoles and Controllers", Feb. 7, 2007, pp. 1-2, published at http://www.decalgirl.com, DecalGirl.com.

Mytego.com, "Cell phone skins and Tego skins for your Mobile phone, cellphone, notebook, laptop, iPo. . . ", Feb. 7, 2007, pp. 1-3, published at http://www.mytego.com, Imbibo Inc.

Schtickers.com, "Schtickers— Laptop Decals, Laptop Skins, and Stickers", Feb. 7, 2007, pp. 1-8, published at http://www.schtickers.com, Retrofitted Designs LLC.

* cited by examiner

Web

Production

ORDER FULFILLMENT AND CONTENT MANAGEMENT SYSTEMS AND METHODS

PRIORITY INFORMATION

This application claims the benefit of priority from U.S. Provisional Application No. 60/856,495 filed on Nov. 3, 2006, the full disclosure of which is incorporated by reference.

This application claims the benefit of priority from U.S. Provisional Application No. 60/941,628 filed on Jun. 1, 2007, the full disclosure of which is incorporated by reference.

This application claims the benefit of priority from U.S. Provisional Application No. 60/956,900 filed on Aug. 20, 2007, the full disclosure of which is incorporated by reference.

FIELD OF THE INVENTION

The present invention relates generally to order fulfillment and content management systems and methods, and in more particular, order fulfillment and content management systems for processing orders for adhesive cover products (aka "skins").

BACKGROUND OF THE INVENTION

Many consumer devices look identical or nearly identical to other consumer devices. Not only do different models manufactured by the same company often times look the same, but so do models made by different companies. For example, the popular Motorola RAZR V3 model looks the same as the Motorola RAZR V3c model. In addition, the Motorola RAZR V3 model (which is a flip-top type mobile phone) looks similar to other flip-top type mobile phones. As another example, the colors and shapes of laptops may vary to some extent; nevertheless, most laptop computers look nearly the same as every other laptop computer.

Because many consumer devices (e.g. mobile phones and laptop computers) are integral with the daily lives of their users, there is a desire to customize or personalize such devices. In response, some manufactures have started making such devices in different colors. However, the number of different colors tends to be limited. In addition, many users believe that simply changing a color is not enough of a personalization/customization.

The process of ordering personalized skins and fulfilling the orders in an efficient, timely and user friendly manner can be difficult. Accordingly, what is needed is an improved order fulfillment and content management system and method for processing skin product orders.

BRIEF SUMMARY OF THE INVENTION

An order fulfillment and content management system and method configured to fulfill a product order for a customized adhesive cover is disclosed. In various embodiments, an order can be placed for a skin in an on-demand nature. In one embodiment, a user can select and customize a skin over a network, via a web site for example, and the resulting skin is manufactured in accordance with that order. Furthermore, various processes can be integrated and moved in concert with one another to provide an efficient and timely fulfillment of the order. The system can also have stake holders present along a queue of an order that can quickly review and identify any problems in an order and arrive at a quick resolution path.

Adhesive covers (aka "skins") can be customized/personalized to the tastes of the owner and affixed to a variety of objects and surfaces. Exemplary adhesive covers for use with a variety of consumer devices are described in U.S. patent application Ser. No. 11/726,960 filed on Mar. 3, 2007 and entitled "Adhesive Cover for Consumer Devices", which is hereby incorporated by reference in its entirety. Exemplary adhesive covers for use with fishing lures are described in U.S. patent application Ser. No. 11/759,600 filed on Mar. 3, 2007 and entitled "Fishing Lures and Adhesive Covers for Same", which is incorporated herein by reference in is entirety. Adhesive covers can also be used with automobiles, boats and household furnishings (such as televisions, refrigerators and wall outlets). Other examples where adhesive covers can be used include on both interior and exterior surfaces of a wall. The wall can be part of a home or in commercial setting.

The adhesive covers can have customized designs and images and can be fashioned to not interfere or interfere minimally with the functionality of a device or other surface to which it is designed to adhere. In this manner, the adhesive covers can also be useful for protecting the object it is adhered to, such as consumer electronic devices (e.g. cell phones and lap top computers) and aiding in company identification, re-branding, enterprise advertising and promotion, and special events marketing.

In addition, adhesive covers can be made in a variety of shapes and sizes. Smaller sized adhesive covers can be used with small consumer electronics, such as a portable digital audio player. Large sized adhesive covers can be made that cover a wall or a portion of a wall, for example. In one such application, a life-sized cutout of a movie star or athlete can be fashioned as an adhesive cover and adhered to a bedroom wall.

Further features and advantages of the present invention, as well as the structure and operation of various embodiments of the present invention, are described in detail below with reference to the accompanying drawings.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

DESCRIPTION OF THE PREFERRED EMBODIMENTS

The present invention is directed toward order fulfillment and content management systems and methods. In one embodiment, the present invention provides a system and method for fulfilling an order for one or more products. In another embodiment, the present invention provides a system and method for end-to-end content management, providing for management at various stages including designing, ordering, record keeping, manufacturing, printing and shipping products. In further embodiments, a system and method are provided for collaborative generation and management of products, and the feature and the functionality of the system can be distributed across a geographically diverse environment.

Before describing the invention in detail, it is useful to describe an example environment in which the invention can be implemented. One such example is that of a skin or adhesive cover for a consumer electronic device. From time-to-time, the present invention may be described herein in terms of this example environment. Description in terms of this environment is provided to allow the various features and embodiments of the invention to be portrayed in the context of an exemplary application. However, this disclosure should not be limited to this specific application, but can also be applied in other ways. For example, other applications that fall within the scope of this disclosure include, but not limited to, adhesive covers for use with cars, boats, household furnishings and fishing lures. Adhesive covers can also be applied to a variety of surfaces, such as the wall in a home or commercial setting. Furthermore, the size of an adhesive cover can be small or large. For example, smaller sized adhesive covers can be made for use with small electronic devices, and larger, life-sized representations of a movie star or athlete can be made in accordance with embodiments of the present invention.

Figure 1:
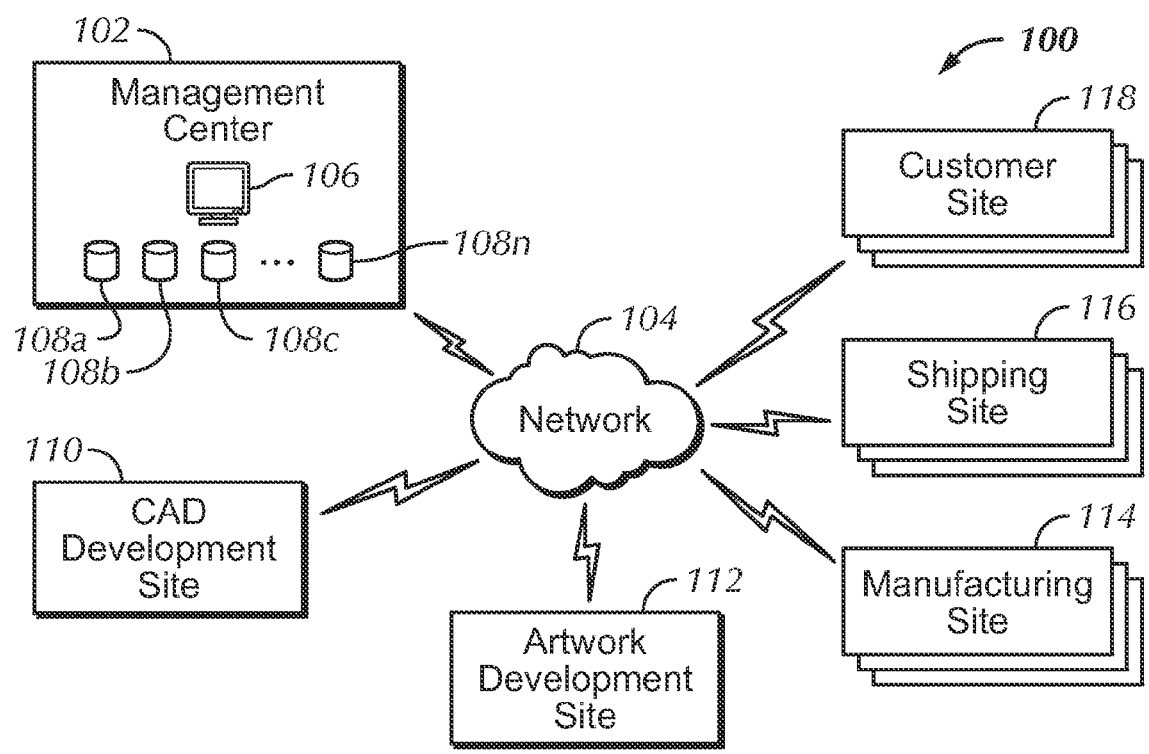
FIG. 1 is a diagram illustrating an example overview of an order fulfillment system in accordance with one embodiment of the invention.

FIG. 1 illustrates an example implementation of an adhesive cover order fulfillment system 100 in accordance with one embodiment of the present invention. Referring to FIG. 1, the order fulfillment system 100 can include a management center 102 in communicative contact with various other components of the order fulfillment system 100 via a network 104. The network can be the Internet, a local area network, wide area network or the like. In one embodiment, the management center 102 is implemented to provide centralized management for providing skin product ordering services, features and functions. In alternative embodiments, the services, features and functions provided by the management center 102 as described herein can be distributed across a plurality of various facilities or locations as would be apparent to one of ordinary skill in the art after reading this description.

With further reference to FIG. 1, the exemplary embodiment of management center 102 is illustrated as including one or more computers or work stations 106 to facilitate operation thereof. Management center 102 can also include one or more databases 108a, 108b, 108c-108n to store the various data and other information used in an order fulfillment process. As described further in examples illustrated below, data content can be maintained and managed relating to order processes, order components, order line items, skins, Stock Keeping Units (SKUs), Computer-Aided Design (CAD) files, form factors, devices and the like. Although separate database units are illustrated, data storage can be across any physical or logical data storage architecture, and any of a number of database models can be implemented. In one embodiment, a relational database structure is used to facilitate creation of responses from various separate sources of data.

In one embodiment, management center 102 is configured to receive information from and provide information to various operational sites to facilitate fulfillment of an order. Such sites can include a CAD development site 110 used to develop CAD files representative of consumer devices, an artwork development site 112 used to generate production artwork printed on skins, one or more manufacturing sites 114 for generating skins, one or more shipping sites 116 for shipping skins to customers, and one or more customer sites 118. Customer sites 118 can include one or more computers used to enter information needed to place a product order. The customer sites 118 can be, for example, an individual, a retailer, wholesaler or other entity desiring to order a product using the order fulfillment system. In one embodiment, a customer site 118 can include a kiosk for providing a walk-up terminal that allows a user to place an order, for example.

These and other sites of the invention can be operated by human personnel (such as employees, customers, third-party distributors, contractors) or implemented using hardware, software, firmware, or a combination thereof. Although the sites are described in terms of somewhat discrete functions that may be performed, this description is not intended to imply that physically or logically separate sites need to be provided to perform various of the described functions. Indeed, as would be apparent to one of ordinary skill in the art after reading this description, functions described as associated with the various sites can be assigned to dedicated personnel, hardware, software or firmware, or one or more functions can share common personnel, hardware, software or firmware.

Figure 2:
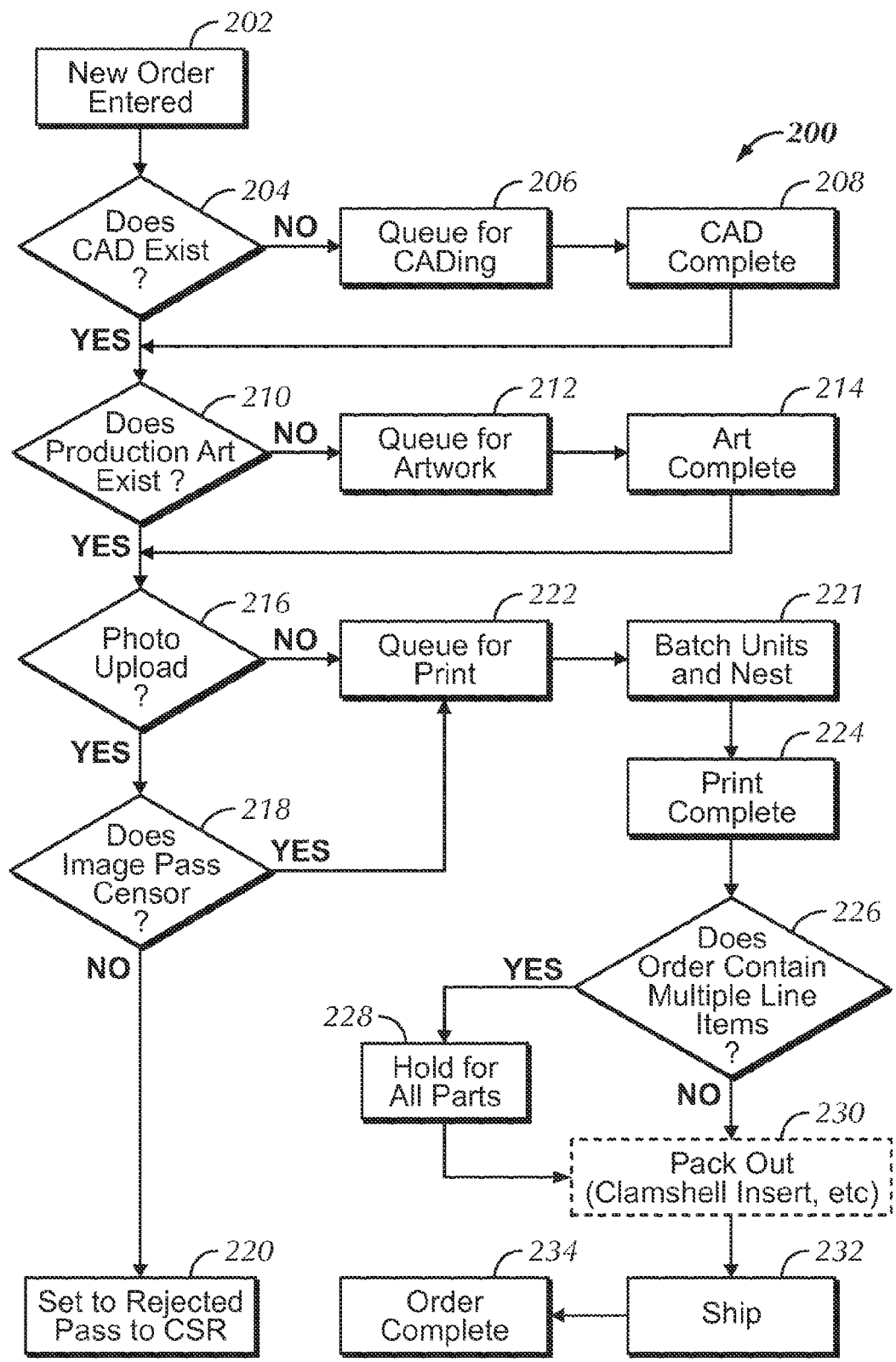
FIG. 2 is a high level flow diagram of an order fulfillment process in accordance with one embodiment of the invention.

FIG. 2 is a high level operational flow diagram illustrating an example order fulfillment process 200 in accordance with one embodiment of the present invention. The process 200 can begin at a step 202, where a new product order is entered. For example, in terms of the example environment illustrated in FIG. 1, an order can be entered at one of the customer sites 116 (FIG. 1) and transmitted to the management center 102 via the network 104. In terms of the example environment, the order can be for one or more personalized skin products.

In a step 204, the process 200 determines if a CAD exists for the product or products associated with the order entered in step 202. If a CAD does not exist, then the system is queued for preparing a CAD in a step 206 and an appropriate CAD is subsequently prepared in a step 208. Further details relating to an exemplary process for producing of a CAD are discussed further below with reference to FIG. 3.

Once the appropriate CAD is completed in step 208 or if it is determined that a CAD for the particular device already exists in step 204, the process 200 determines if appropriate production art exists for the associated product in a step 210.

If appropriate production artwork does not exist, then the order is queued in a step 212, and produced in a step 214. If appropriate production artwork does exist, then the process 200 proceeds to a step 216. Further details relating to an exemplary process for producing production art are discussed further below with reference to FIG. 4.

Once the appropriate production artwork is completed in step 214 or if it is determined that appropriate artwork already exists in step 210, then the process 200 determines whether an image is to be uploaded in the step 218. In general, an image upload process in accordance with an embodiment of the present invention permits a user (e.g. customer) to upload an image from a remote site (such as customer site 118) and incorporate the uploaded image onto (or into) the product being ordered. Further details relating to an exemplary image upload process is described in more detail later in this disclosure.

FIG. 2 shows that after completion of the artwork in step 214, the process 200 proceeds to step 216, which entails querying whether an image is to be uploaded. However, in alternative embodiments, the completion of the artwork in step 214 can proceed directly to the print queue step 222. In this regard, in various embodiments, a user can use either production art or an uploaded image. In other embodiments, a user can use both production artwork and an uploaded image to customize an adhesive cover. In addition, a user can upload an image and then modify the image using image editing tools provided via a website interface.

If it is determined that an image is to be uploaded in step 218, then the system uploads the image and determines if the image passes an image censor in step 218. In general, the image censor can determine whether the image complies with predefined rules. The rules can include the image being of sufficient quality, format and size. The rules can also include rules disallowing inappropriate images, such as images containing unauthorized works (e.g. unauthorized trademarks or copyrighted material) or images displaying pornographic or violent content for example. The image censoring functions can be performed by a person reviewing the images or by a computer algorithm designed to detect unauthorized images, or both. In one embodiment, a computer algorithm performs an initial check on all uploaded images. If an image passes the initial check, then the image passes the censor. On the other hand, if the image fails the initial check, then the image is sent to a reviewing person for manual review.

If the image does not pass the censor, then the order is rejected and passed to a customer service representative (CSR) in a step 220. In this step, a customer service representative, located at management center 102 (FIG. 1) for example, can review the order and take appropriate action. For example, the customer service representative can contact the customer who placed the order and discuss the reasons for the order being rejected. The customer service representative can also assist the customer in placing an order that will not be rejected.

Referring back to steps 218 and 216, if it is determined that the customer is not going to upload an image in step 216 or if an image is uploaded and passes the censor in step 218, then the process 200 proceeds to a printing queue in a step 222. Next, in step 221, a batch is nested in step 221 and printed in step 224. Nesting is described in more detail with reference to FIG. 8 and related disclosure.

After printing in step 224, the process 200 may then determine whether the order contains multiple line items in a step 226. If the order does contain a number of line items, then the process 200 holds the order until all parts of the order are completed in step 228.

Next, the order is packed in a step 230 and shipped to the customer or a location designated by the customer in a step 232. The order fulfillment process 200 is then complete in a step 234.

A predefined CAD production flow can be beneficial to ensure uniformity and that orders are completed. As described above with reference to the general order fulfillment process 200, a step can be to verify that a CAD (or cut-file) exists for a particular device. In the event that a suitable CAD does not exist, the order can be held in a CAD queue, such as the CAD queue step 206, for example. When an item is added to the CAD queue, two things can happen. First, an entry can be added to an on-line terminal which can show a list of all outstanding CAD requests, including relevant details associated with each request (e.g. device manufacturer, device name, date request was placed, and location of the physical device). Second, a notification, such as an email notification, can be sent out to some or all individuals who are involved in the CAD creation and approval process. In an exemplary environment, a typical order will not require CAD processing because an appropriate CAD file will likely exist in most instances. Instead, most instances where CAD processing may be needed is for unique business-to-business orders (e.g. orders placed through a retail customer), as those types of CAD files may not have been created yet.

Figure 3:
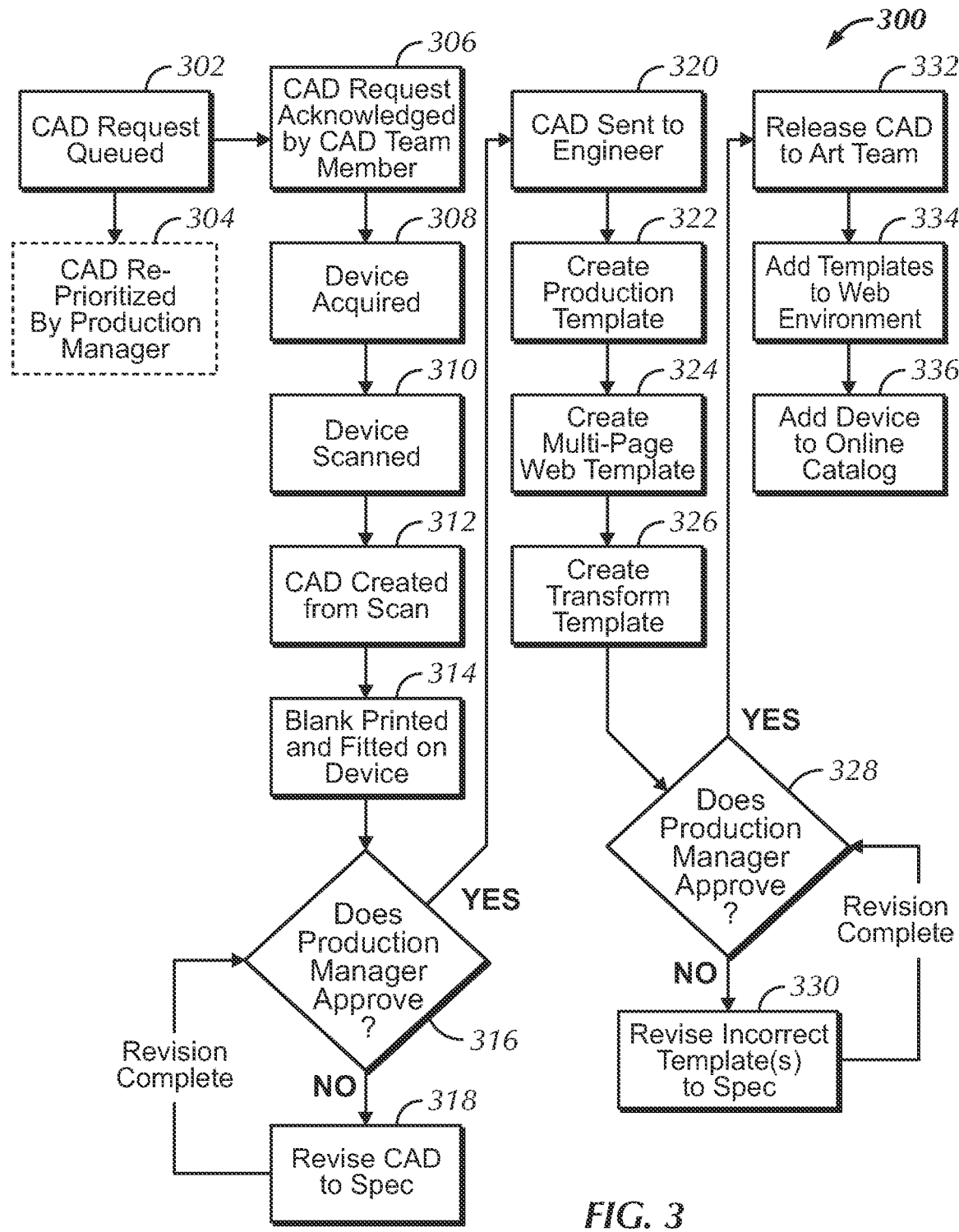
FIG. 3 is a flow diagram of a CAD production process in accordance with one embodiment of the invention.

FIG. 3 is a flow diagram of a CAD production process 300 in accordance with one embodiment of the present invention. A CAD request can be queued at step 302. The priority or order of the queue can be re-prioritized by a production manager in a step 304, if desired. Next, in a step 306, a Cad request can be acknowledged by a CAD team member, which can indicate that a team member is working on producing the subject CAD. The team member can then acquire a device associated with the CAD request in step 308, scan the device in step 310, and produce a CAD created from the scan in step 312. A blank form of the device can then be printed and fitted onto the device in step 314. A production manager can then review the form on the device and provided his or her approval or disapproval in step 316. If the manager disapproves, then the team member may need to revise the CAD to specifications in step 318 and request approval once again in step 316.

After the manager provides approval in step 316, customized web templates can be created in steps 320 through 326. To create the custom templates, the CAD can be sent to a software engineer. The software engineer can then produce a production template in step 322, a multi-page web template in step 324, and a transform template in step 326. A manager's approval of the templates can then be requested in a step 328, and revised if not approved in step 330. If approval is given, then the CAD can be released to an art team in a step 332 for producing artwork for the associated CAD. The templates prepared in steps 322, 324 and 326 can be added to a web environment in step 334 and the device of the associated CAD can be added to an on-line catalog in step 336.

As described above in FIG. 2, once an order has passed the CAD creation process (step 208 in FIG. 2) or if it is determined that a CAD already exists (step 204), a next step can be to determine if artwork exists (step 210) to support a print process. In one embodiment, the system 100 can verify that production artwork exists by searching an art-work database. The search can include verifying that artwork exists for each CAD file associated with the order. In the event one or more of the CAD files do not exist, the system can "trap" the order in the art production queue (step 212) and a job can be automatically assigned a priority (which can be changed by an art production manager) and assigned to an artist.

Figure 4:
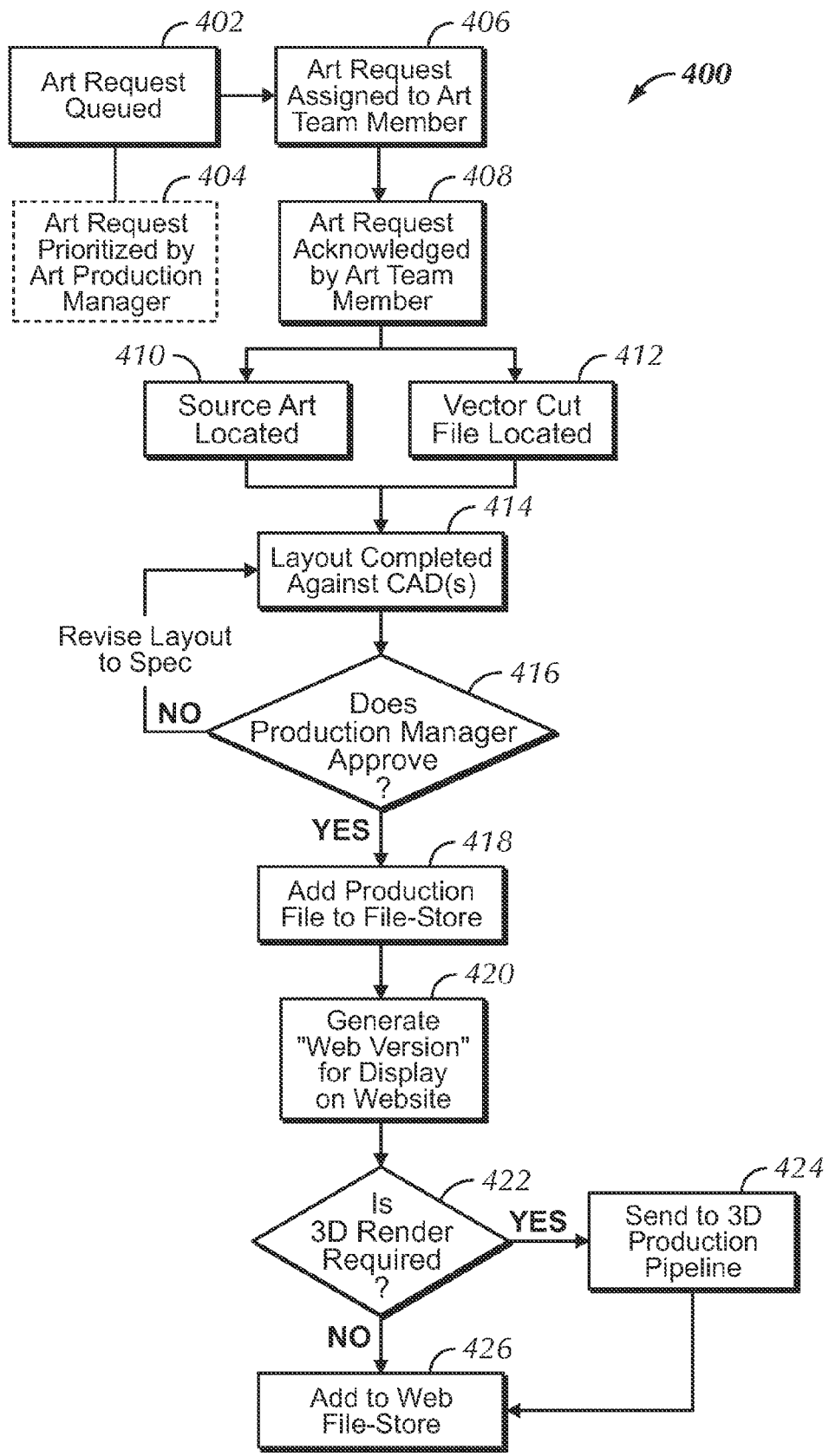
FIG. 4 is a flow diagram of an art production process in accordance of one embodiment of the invention.

FIG. 4 is a flow diagram of an exemplary artwork production process 400 in accordance with various embodiments of the present invention. In step 402, an art request can be queued as described above. An art production manager can view the queue and reprioritize as desired or needed in step 404. In step 406, the art request can be assigned to an art team member and the art team member can acknowledge the art request in step 408. The art team member can then locate source artwork and a vector cut file in steps 410 and 412, respectively, and completes an artwork layout against the CAD or CAD designs in step 414. An art manager can then approve or disapprove the layout in step 416. If disapproved, then the layout is revised until approval is given. Once the manager approves the artwork layout, a production file containing the artwork layouts can added to an art production database in step 418.

A "web version" of the artwork can then be created in step 420. The web version can be used for displaying a representation of the artwork on a website used for ordering skins. In this manner, a customer can view and select artwork to be used with a skin, for example.

In step 422, the process 400 determines whether a 3-dimensional rendering should be created. If so, a request can be sent to create a 3-dimensional rendering in step 424. 3-dimensional renderings and web versions of the associated artwork can then be stored in a web database in a step 426. A customer can then view the stored renderings and web versions of the artwork to assist the user in ordering one or more skins.

In addition to artist rendered layouts, another feature of various embodiments of the present of the invention is to permit users to submit their own artwork through a flash based image upload mechanism. The system can permit a customer to submit one or more images and lay the images on top of a device of their choosing. The images can be rotated, scaled, panned, and layered. Additionally, the user can select a background color and superimpose text messages on the image.

The photo upload mechanism can also utilize a work flow document format. In an exemplary embodiment, the structure of a web-based work flow document is different from a production work flow document. This difference can be due to the fact that web work flows can be primarily concerned with clear and intuitive presentation to the end user (e.g. on the end user's workstation); whereas, production work flows can be primarily concerned with space efficiency.

Figure 5A:
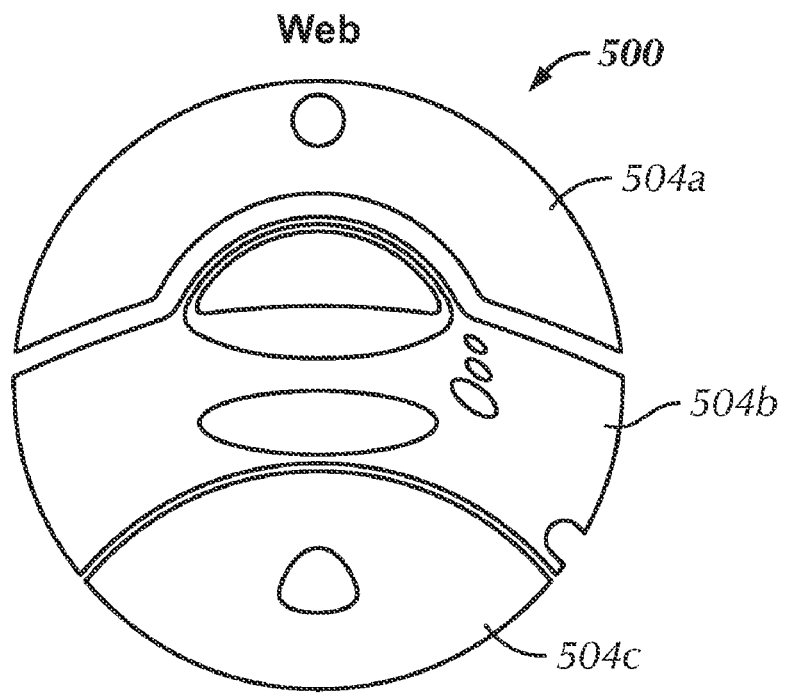
FIG. 5a illustrates a web version of a work flow document and FIG. 5b illustrates a production version of a work flow document in accordance with one embodiment of the invention.
Figure 5B:
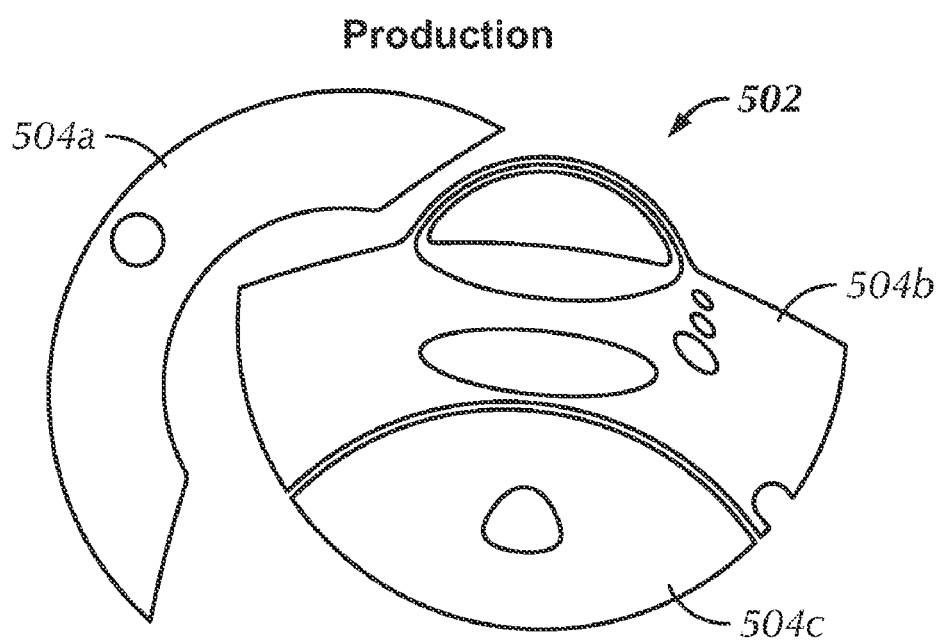

An exemplary web work flow document 500 for an iRobot Roomba device is shown in FIG. 5a and the associated production work flow document is shown in FIG. 5b. As illustrated, the web version (FIG. 5a) can display a pattern of a skin, including its various pieces 504a, 504b and 504c, in a substantially similar configuration as the skin will be when affixed the device. In contrast, the production version (FIG. 5b) shows the pattern in a configuration that would be used during a manufacturing process to save space on the material layer(s) on which the skins are printed.

In accordance with various embodiments, skin production templates can have a web version and a production version due to presentation versus printing differences. For example, web versions need not show image bleed; whereas, the production version can show image bleed. Because of the differences between the web version and the production version, it can be beneficial to have a third template, which mediates the differences between the web version and the production version. This third template can be referred to as a "transform" template, as it can transform the artwork from one work flow layout to another.

Figure 6:
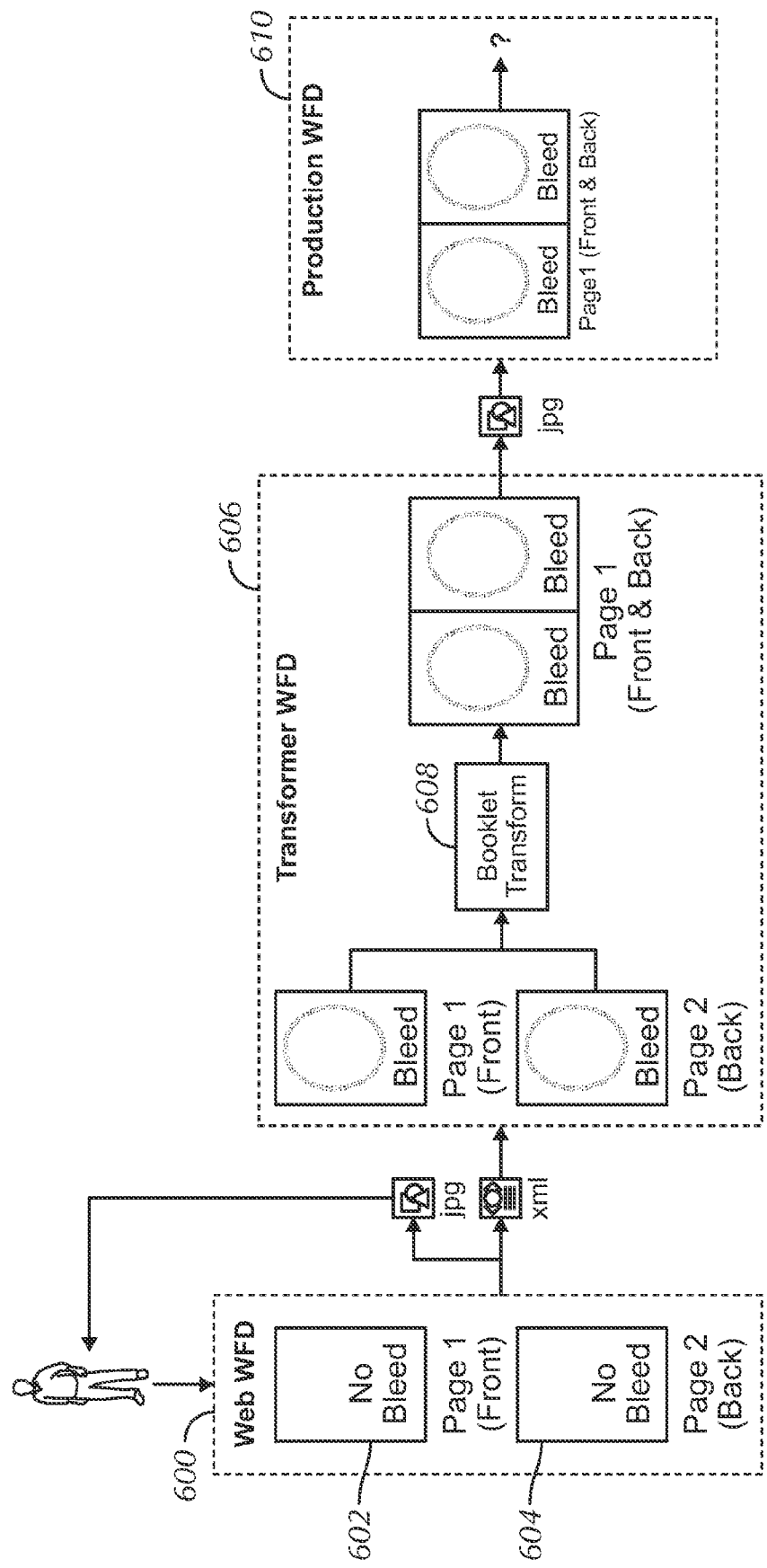
FIG. 6 illustrates an exemplary process of converting a web version work flow document into a production work flow document using a transformer work flow document in accordance with one embodiment of the invention.

An exemplary upload work flow transform is depicted in FIG. 6. Here, a web work flow document 600 can comprise a front piece 602 and back piece 604 shown spaced apart and vertically. The web flow need not be presented in this exact format, but it is desired that the configuration be such that is easy for a customer to view. A particular image format, such as jpeg, of the web work flow document can be used for displaying a representation of the skin to a customer or user via a web site. The web work flow document can then be rendered in a different data format, such as XML, and applied to a transformer work flow template 606. The transformer work flow 606 can include a booklet transform 608 that uses a rule set to convert the web version into a production configuration. The work flow document can then be converted into another data format (such as jpeg) and into a production work flow document 610 for use during the production or manufacturing process.

As discussed above with reference to step 218 of FIG. 2, after a customer designs a custom skin, the status of the order can be placed in a "pending approval" state where it awaits for censor approval. If approval is provided, then the order can be sent to the production queue. However, if the artwork is rejected, a SKU of the line item can be automatically updated to that of a pin code good for any design on a similarly sized device.

To facilitate an order fulfillment process, a content management system can be implemented in accordance with various embodiments of the present invention. In general, a content management system can facilitate processing an order by categorizing various types of information used to fulfill an order and establishing relationships with that information. This can reduce duplication of information and efforts to produce information by maintaining information in an organized, logical manner.

An exemplary content management system for fulfilling an order for a skin product is described with reference to the relationship diagram in FIG. 7. As shown, content management system 700 can include a plurality of records, each of which can be embodied as a data file or the like and each can contain a plurality of data fields, for example. To illustrate particular benefits of the content management system 100 (shown in FIG. 1), the relationship between device record 702, form-factor record 704 and CAD record 706 will now be explained. A device record 702 can be representative of a particular physical product (e.g. Motorola RAZRV3, Apple iPod 5G and HP Slimline) and can include information like the device's associated serial number, abbreviation, manufacture identifier and form factor identifier. In one embodiment, each referenced device can have a single record, regardless of its physical characteristics (i.e. its form factor). As an example, the Motorola RAZRV3 and the Motorola RAZRV3c have distinct device records, even though each model has an identical form factor (because they are the same shape and size). As briefly discussed above, form-factor records 704 can describe distinct physical characteristics of a device. The physical characteristics can include the size and shape of the device. To illustrate, again consider the RAZRV3 and RAZRV3c. Both devices have identical shapes and sizes and, thus, have identical form factor records 704. In other words, a form-factor created for the RAZRV3 is equally applicable to the RAZRV3c. In such a case, there is no need to store more than one form-factor record 704. More than one form-factor record can mean duplication of efforts both in "CADing" and art production. Accordingly, a plurality of device records 702 can be linked to a single form-factor 704.

Figure 7:
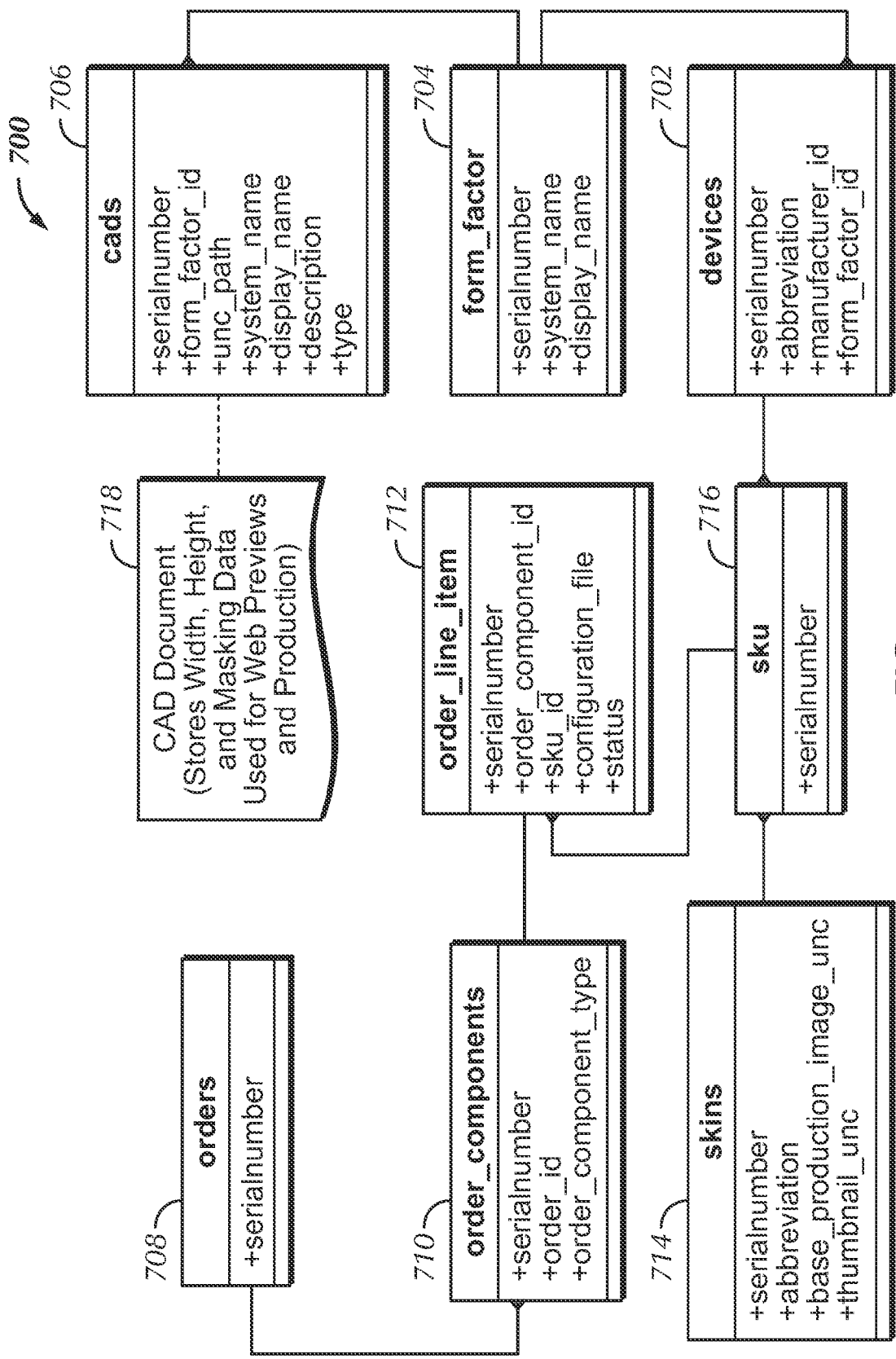
FIG. 7 is an entity relationship diagram showing the relationship between various records used to manage order content in accordance with one embodiment of the invention.

With further reference to FIG. 7, CAD records 706 can be representative of distinct parts comprised in the form-factor records 704. Consequently, more than one CAD record 706 may be linked to a single form factor record 704. To illustrate, the HP Pavilion S7000 series desktop computer may have six parts used to describe the entire device: front, top, top left, bottom left, top right and bottom right. As such, six CAD records 706 may be used to describe the device; one CAD record for each distinct part.

Another feature that can be implemented in content management system 700 is CAD typing. FIG. 7 illustrates CAD typing files 718 associated with the CAD records 706. In one embodiment, system 700 can support four CAD types, although more or fewer CAD types may be used as needed. The four CAD types can include a production type, a web type, a transform type and an art team type. The production type can support the print solution. The web type and the transform type can support a photo-upload process, for example, as referenced above.

With further reference to FIG. 7, an order record 708 can be associated with a particular order and include a serial number field associated with that particular order. As each order can comprise a number of order components, each order record 708 can be associated with a plurality of order component records 710. In one embodiment, each order component record 710 includes a serial number field, an order identification field, and an order component type filed.

Further to FIG. 7, each order component record 710 can have an associated order line item record 712. The order line item 712 can have a plurality of fields, including serial number field, order component field, sku identifier field, configuration file field and a status field.

With further reference to FIG. 7, a skin record 714 can include a serial number field, an abbreviation filed, a base production image filed and a thumbnail image filed. Each skin record 714 can be associated with a plurality of sku records 716, which can include a serial number field. In addition, each sku record can be associated with a plurality of order line item records 712.

In one embodiment, the sku number in each line item of an order can define both a design code and a device code. The device code can be used to look up the appropriate CAD by traversing the form factor records. Since an optional feature of a fulfillment process is to determine if production artwork exists, the production artwork can be named using the following convention:

PRODUCT TYPE+DESIGN CODE+PRODUCTION CAD NAME+(CUSTOM UPLOAD ID (if present).EXT

For example, a skin (SKN) with a Tinkerbell design (TNK-BELL) on a Motorola RAZR CAD (MTRRZR) could be SKNTINKBELLMTRRZR.ext; whereas Tinkerbell on the left side of an HP Slimline (HPS7K) could be SKNTINKBELLHP7K-LEFT-TOP.ext and SKNTINKBELLHP7K-LEFT-BOTTOM.ext (remembering that the left and right side of the Slimline can be split into two parts or CADs).

In accordance with various embodiments, orders for skins can be placed through participating websites. As described above, as orders are enrolled, they can be verified for production. In other words, the system can ensure the files necessary to produce the skin are available and correct. Once verified, the line items can be added to a production queue. The production queue can be managed by a production planner. The production planner can alter the priority of orders in batch, force orders through the process, or withhold orders as the situation calls. Once the planner is satisfied with the batch composition, the batch can be released to a nesting solution.

A nesting solution can be a process of placing images in an arrangement that results in minimal waste of material. Nesting operations can vary in complexity based on several factors, such as the complexity of the shapes to be nested, the rules imposed on the nesting solution, and the number of units to be nested together.

Nesting can reduce waste management material, which can become increasingly important as more expensive substrates are used. In addition, one can intermix devices of varying shapes and sizes in a single batch using a nesting solution. This can allow a manufacturer to produce all parts of a multi-part order in a single batch, which can have beneficial implications for order management and fulfillment.

Figure 8B:
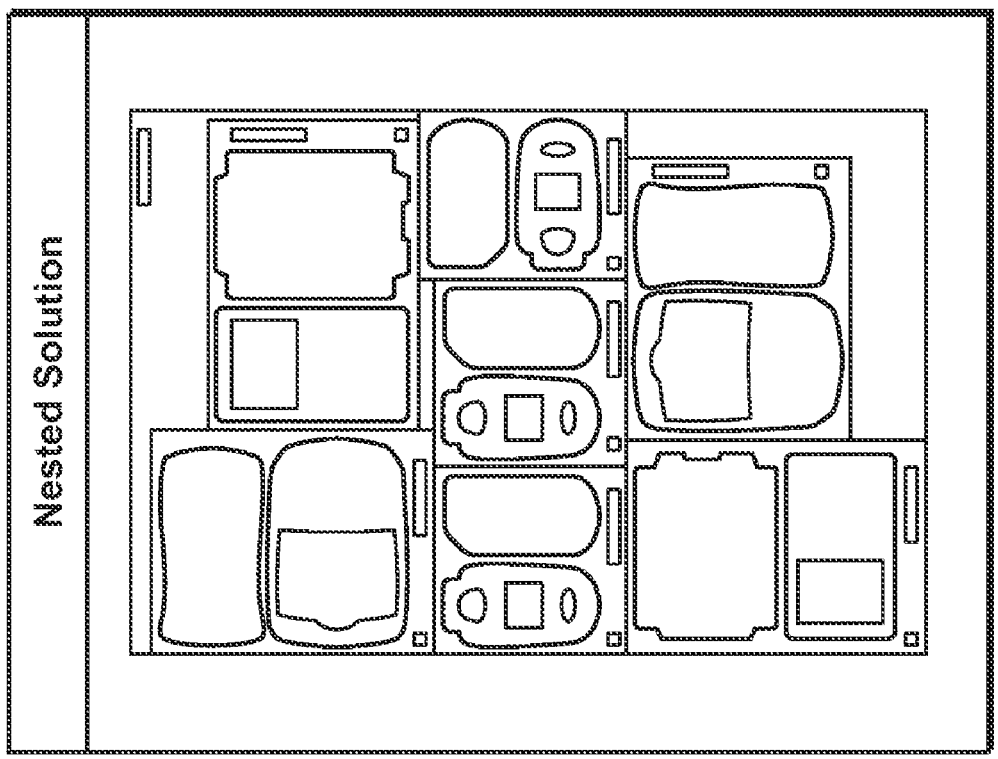
FIG. 8a is a top view of a grid-based layout and FIG. 8b is a top view of a nested solution layout in accordance with one embodiment of the invention.
Figure 8A:
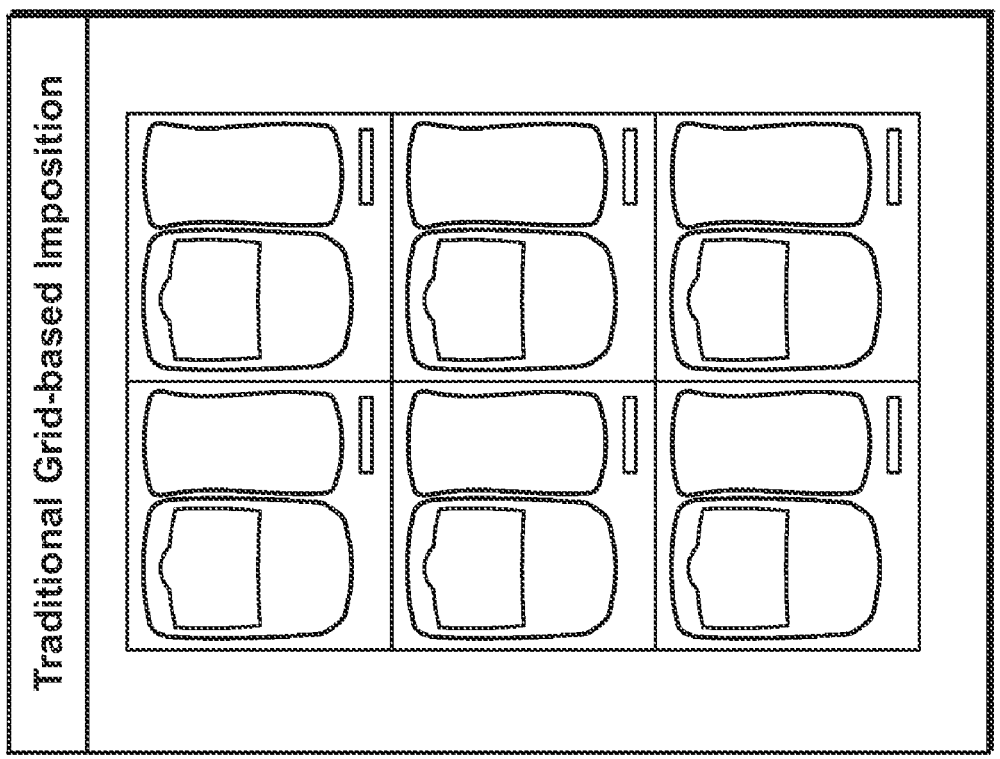

FIG. 8a illustrates a grid based imposition and FIG. 8b illustrates a nested solution. As illustrated, the nesting solution comprises a plurality of intermixed devices and arranges the devices in a manner that reduces waste.

In accordance with various embodiments of the present invention, a key-based nesting solution can be implemented. Here, a key can be used, which can be any metric used to inform a nesting algorithm of the order in which nesting should occur. For example, an order number can be used as the key. By assigning multiple units to the same order number, the system can control how the nesting algorithm solves the layout. Various rules can be applied to solve the layout, such as rules requiring units with the same key to be spaced apart not more than a predefined distance and/or that units with the same key possess the same orientation. Such rules can be useful in enforcing a given output for a nesting solution and can be used to simplify other manufacturing issues.

As an example of a key-based nesting, consider the production of a large number of orders, such as 500 orders, and a nesting solution which does not recognize a key. Furthermore, each order can include two or more units of various sizes. A nesting solution can be used to produce an efficient and cost effective solution, for example to minimize waste area. Without control over how the nest is performed, however, many of the orders can be split across an entire batch, which can consist of several hundred pages. This means that when a unit comes off the production line, it may need to be held in queue until the second unit is complete. This can create a complex pick and pack problem, which may require additional resources to properly manage. This in turn can introduce inefficiency and higher risk of error.

A key-based nesting solution can solve the above problems by nesting against the order using a rule that enforces units of the same order to be placed a predefined distance apart from one another, for example 30" apart. This can ensure that units come off of the production line at approximately the same time while giving the nesting solution enough leeway to compute a space efficient solution.

Figure 9:
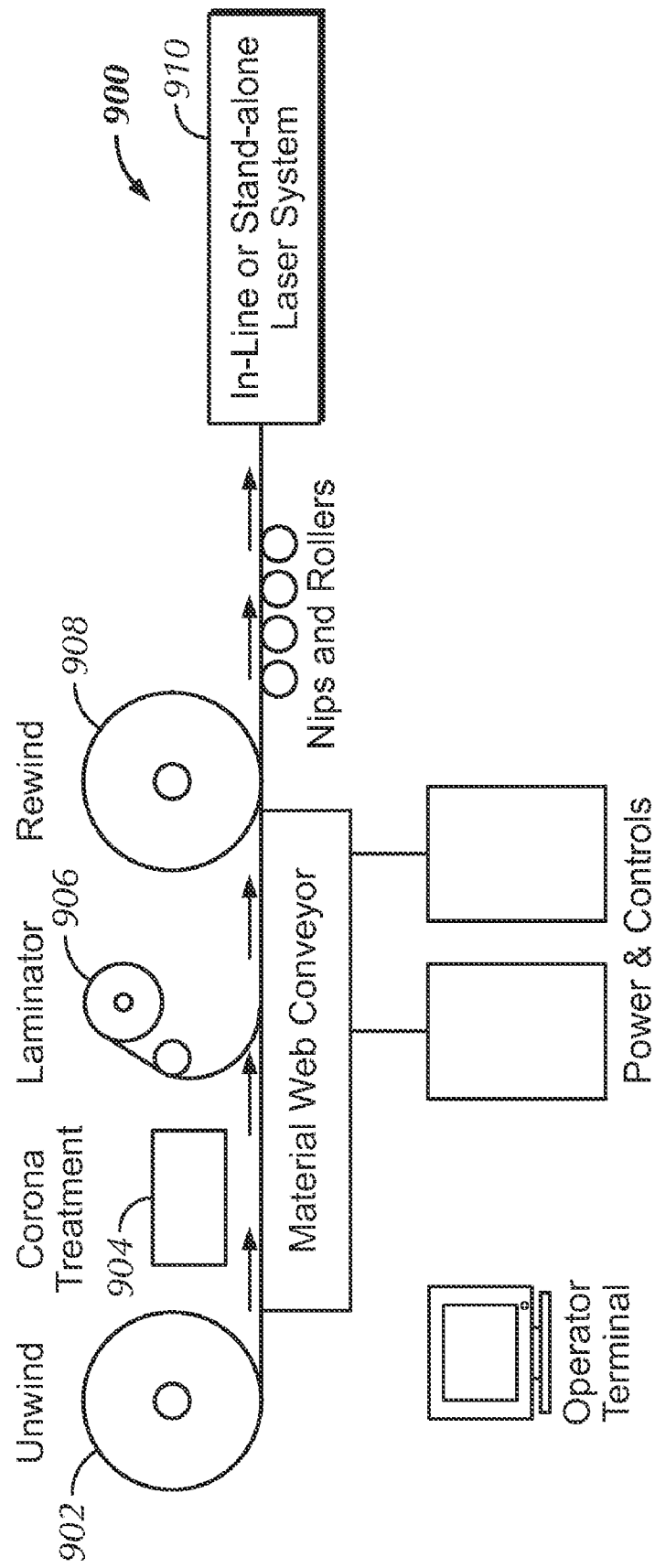
FIG. 9 is a diagram illustrating a corona treatment/laminator in accordance with one embodiment of the invention.

To assist in the production of skins, an inline material treatment and on-demand cutting/fulfillment system may be implemented in accordance with various embodiments. With reference to FIG. 9, a fulfillment system can include a treater/laminator 900 designed to fit in-line with a digital printer, such as the WS4500 press made by Hewlett Packard Co. The treater/laminator 900 can include a web in feed/material accumulator to accommodate rolls up to, for example, 14 inches in width on 3 inch cores. Roll lengths can be up to, for example, 3000 feet. An unwind 902 on the treater/laminator can be a pneumatic core. A corona treater 904 (Enercon Industries Corporation or Sherman Treaters Ltd., for example) can be optionally included and, if so, a dancer and roll in can be fed to an in-line laminator 906 that utilizes self wound or liner over laminate. The corona treated (if corona treatment is used) and laminated roll-to-roll material can then be rewound on a pneumatic core rewind 908. The unwind and rewind can have tension control. The unwind diameter (roll diameter on a 3 inch core) can be 28 inches; the rewind diameter can be 20 inches. The treater/laminator 900 can then rewind the material so a roll can be taken off and put on the cutting machine or pass the material to a laser cutting module 910 in accordance with one embodiment of the invention.

Figure 10:
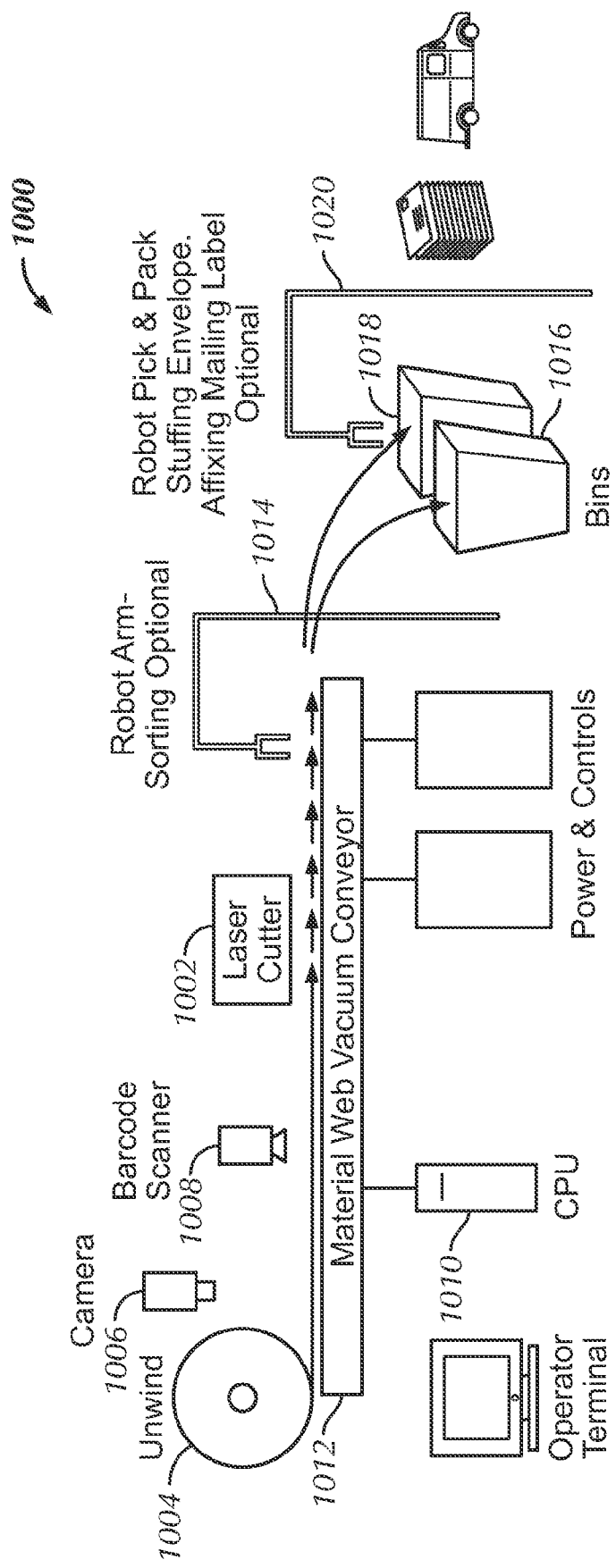
FIG. 10 is a diagram illustrating an on-demand cutting and order fulfillment system on accordance with one embodiment of the present invention.

FIG. 10 shows a cutter and fulfillment system 1000 in accordance with an embodiment of the present invention. A cutting mechanism 1002 can receive material roll-to-roll either by having a roll placed on an unwind 1004 of the cutter and fulfillment system 1000. Alternatively, the material can be passed via a series of nips and rollers, where it is fed to a cutting mechanism via a vacuum web or collected in an accumulator and fed to the laser cutting mechanism. Two cameras 1006 (one camera shown) can read fiducial marks on the material rolls and align the cutting mechanism 1002 as the material is fed through the cutter and fulfillment system 1000. A bar code scanner 1008 can read the barcode on the printed roll prior to cutting. Cutting instructions, stored as software on the laser cutting mechanism CPU 1010 for example, can then access the corresponding pre-stored cut pattern file from a database stored in memory, and begin cutting accordingly. The cutter mechanism 1002 can be a laser cutter utilizing one or multiple $CO_2$ beam steered lasers to cut the material. Each laser can be 500 or 1000 watts, but it is appreciated that other lasers can be used as well. The laser cutter and fulfillment system 1000 can utilize a vacuum web conveyor 1012 to hold parts in place. The cutter and fulfillment system 1000 may also utilize a second vacuum web conveyor to discard waste material and pass finished parts forward.

Further to FIG. 10, after parts are cut, software programs associated with the cutter and fulfillment system 1000 can drive a robotic arm 1014 to separate skins or devices with skins from waste material. The robotic arm 1014 can sort orders of both large and small parts into bins 1016 and 1018, respectively. The parts can be scanned again in-line. Once all parts for any given order have been verified and scanned, an appropriate shipping label, packing slip and other inserts can be printed and married with the parts in appropriate sized envelopes or tubes by another robotic apparatus 1020.

In accordance with one embodiment, a batch of files to be cut containing cut information (die lines, etc.) can be sent to the CPU 1010 of the laser cutter and fulfillment system in advance for pre-processing. In this process, die lines can be converted into laser instructions such as mirror angles, beam power, cut inside or outside the die line, beam width, etc. Each frame can contain two fiducial marks for orientation, and one barcode—which can allow the system to reference the appropriate cut information. The fiducial marks can be read by the in-line camera based vision system 1006 and an in-line barcode reader 1008 can read the barcode on each frame as the material passes through the cut system. A gap between the readers and the laser head can be fixed and the speed of the web 1012 can be controlled. As such, informing the laser mechanism when to cut can be calculated using the web 1012 speed and the dimensions of the known gap. The cut parts can then advance on the web 1012 to the pack out robotic arms. Part orientation information can be sent to the CPU 1010 controlling the robotic arm 1014 in advance and inform the arm about the location of the parts in each frame on the web 1012 and where to pick up the part or multiple parts using X and Y axis information. An in-line camera system or camera systems on the robotic arm 1014, or arms, can read the fiducial marks on the sheet of laser cut parts to stay calibrated, orientated and to maintain a synchronous web speed. Parts can then be sorted by size and placed into two bins. For example one bin for all orders with laptop sized parts and another bin for orders with wireless handset sized parts. The parts can be orientated uniformly in the bins. A second robotic arm with a bar code scanner or an inline barcode scanner can scan a secondary "unit barcode", which references the part information, and performs a vision inspection. Bad parts can then be parsed and placed in a reject bin. Based on the reason for the defect, the part can then be re-queued into an artwork queue or print queue via an order fulfillment system, such as one of the systems described in this disclosure. Shipping labels, inserts and invoices can be pre printed sequentially based on an .xml data format and fed to printer memory. The material can be inserted into an appropriate sized envelope or tube and married with the correct parts. Shipping labels can also be affixed to the envelope or tube. A vision system can track for errors and parts with poorly affixed labels or insert errors. Those orders with errors can be set aside for manual inspection and for manual entry for re-print.

The cutter and order fulfillment system 1000 can feed data back to the management system 102 (FIG. 1) that parts were cut correctly and that the parts were packed out correctly. By recognizing any defects, the management system 102 can then take action to correct the defect and reprocess the order correctly.

As discussed above, the embodiments of the present invention disclosed herein are not limited to a particular adhesive cover size. For example, large-format printing can be used for printing large adhesive covers capable of covering all or a portion of wall, automobile or boat. A large-format printer can be used to print the image, such as the Scitex TJ8500 Turbojet available from Hewlett Packard.

Various forms of control logic can be used to implement the various features and functions associated with the invention. Such control logic can be implemented using hardware, software, or a combination thereof. For example, one or more servers, computing systems, controllers, processors, processing systems, ASICs, PLAs, and other computing devices, logic devices, modalities or components can be included to implement the desired features and functionality.

Figure 11:
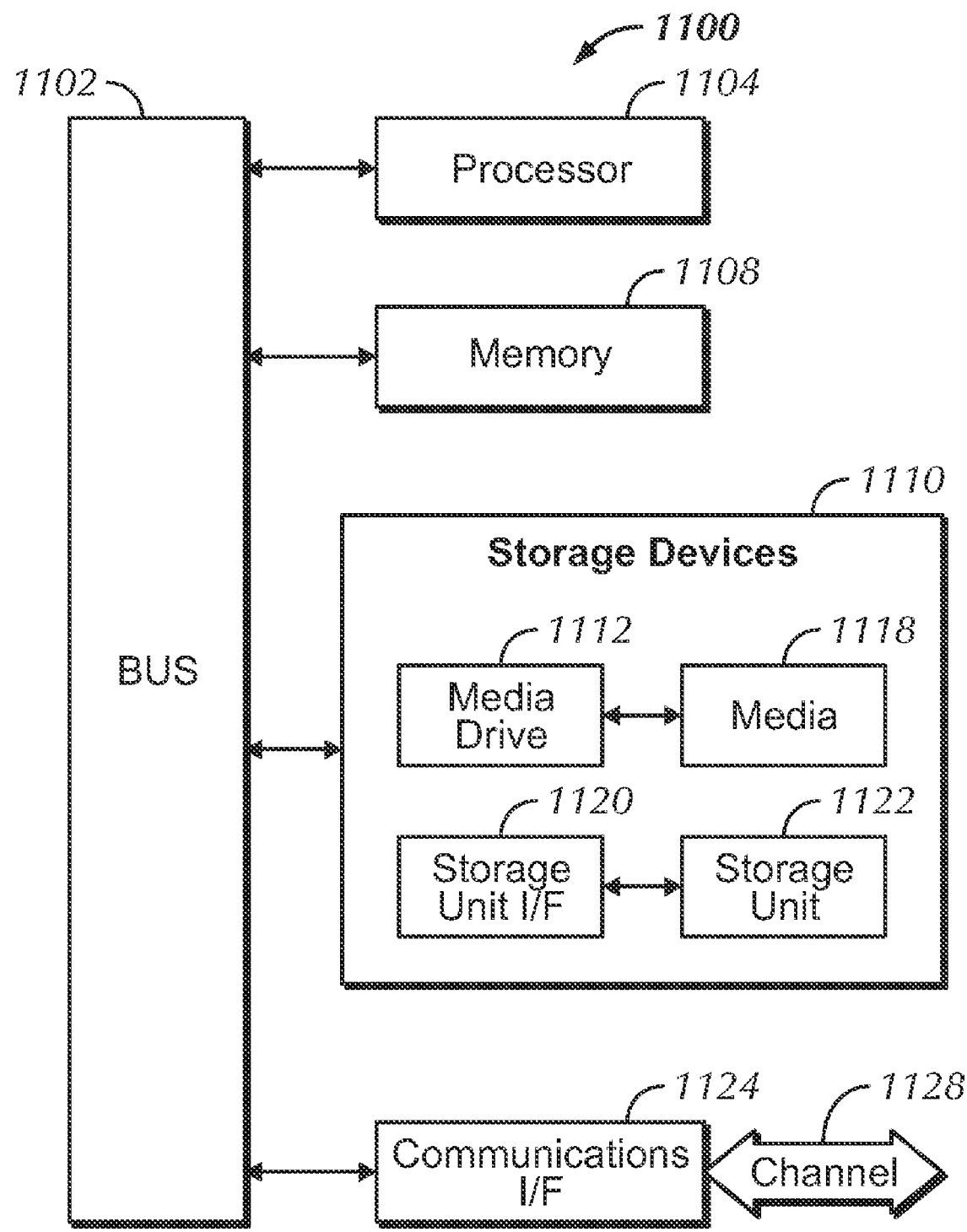
FIG. 11 is a diagram illustrating an example computing system in which various facets of the present invention can be implemented.

In one embodiment, these elements are implemented using one or more computing systems capable of carrying out the functionality described with respect thereto. One such example computing system is shown in FIG. 11. Computing system 1100 may represent, for example, desktop, laptop and notebook computers; hand held computing devices (PDA's, smart phones, palmtops, etc.); mainframes, supercomputers, or servers; or any other type of special or general purpose computing devices as may be desirable or appropriate for a given application or environment.

Referring now to FIG. 11, the computing system 1100 can include one or more processors, such as a processor 1104. Processor 1104 can be implemented using a general or special purpose processing engine such as, for example, a microprocessor, controller or other control logic.

In the example, processor 1104 is connected to a bus 1102 or other communication medium. Various software embodiments are described in terms of this example computing system 1100. After reading this description, it will become apparent to a person skilled in the relevant art how to implement the invention using other computer systems or architectures.

Computing system 1100 also includes a main memory 1108, preferably random access memory (RAM) or other dynamic memory, for storing information and instructions to be executed by processor 1104. Main memory 1108 also may be used for storing temporary variables or other intermediate information during execution of instructions to be executed by processor 1104. Computing system 1100 can likewise includes a read only memory ("ROM") or other static storage device coupled to bus 1102 for storing static information and instructions for processor 1104.

The computing system 1100 can also include information storage mechanism 1110, which can include, for example, a media drive 1112 and a removable storage interface 1120. The media drive 1112 can include a drive or other mechanism to support fixed or removable storage media. For example, a hard disk drive a floppy disk drive, a magnetic tape drive, an optical disk drive, a CD or DVD drive (read or read/write versions), or other removable or fixed media drive. Storage media 1118, can include, for example, a hard disk, a floppy disk, magnetic tape, optical disk, a CD or DVD, or other fixed or removable medium that is read by and written to by media drive 1112. As these examples illustrate, the storage media 1118 can include a computer usable storage medium having stored therein particular computer software or data.

In alternative embodiments, information storage mechanism 1110 may include other similar instrumentalities for allowing computer programs or other instructions or data to be loaded into computing system 1100. Such instrumentalities can include, for example, a removable storage unit 1122 and an interface 1120. Examples of such can include a program cartridge and cartridge interface, a removable memory (for example, a flash memory) and memory slot, and other removable storage units 1122 and interfaces 1120 that allow software and data to be transferred from the removable storage unit 1118 to computing system 1100.

Computing system 1100 can also include a communications interface 1124. Communications interface 1124 can be used to allow software and data to be transferred between computing system 1100 and external devices. Examples of communications interface 1124 can include a modem, a network interface (such as an Ethernet or other NIC card), a communications port (such as for example, a USB port), a PCMCIA slot and card, etc. Software and data transferred via communications interface 1124 are in the form of signals which can be electronic, electromagnetic, optical or other signals capable of being received by communications interface 1124. These signals are provided to communications interface 1124 via a channel 1128. This channel 1128 can carry signals and can be implemented using a wireless medium, wire or cable, fiber optics, or other communications medium. Some examples of a channel can include a phone line, a cellular phone link, an RF link, a network interface, a local or wide area network, and other communications channels.

In this document, the terms "computer program medium" and "computer usable medium" are used to generally refer to media such as, for example, memory 1108, storage device 1118, a hard disk installed in hard disk drive 1112, and signals on channel 1128. These and other various forms of computer usable media may be involved in carrying one or more sequences of one or more instructions to processor 1104 for execution. Such instructions (which may be grouped in the form of computer programs or other), when executed, enable the computing system 1100 to perform features of the present invention as discussed herein. In particular, the computer programs, when executed, enable the processor 1104 to perform the features of the present invention.

In an embodiment where the elements are implemented using software, the software may be stored in a computer program product and loaded into computing system 1100 using removable storage drive 1114, hard drive 1112 or communications interface 1124. The control logic (in this example, software instructions), when executed by the processor 1104, causes the processor 1104 to perform the functions of the invention as described herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

What is claimed is:

1. An order fulfillment process for fulfilling a customized order for an adhesive cover, comprising:
   receiving a customized order for an adhesive cover associated with a particular consumer device;
   determining, via a computer, if a CAD file associated with the particular consumer device does not exist and, if it is determined that the CAD file does not exist, generating the CAD file; and
   determining if production artwork does not exist for the CAD file and, if it is determined that the production artwork does not exist, generating the production artwork.

2. The order fulfillment process of claim 1, further comprising determining if a user has requested an image upload and, if it is determined that the user has requested an image upload, then uploading an image provided by the user.

3. The order fulfillment process of claim 2, further comprising producing a skin layout based on the CAD file and the image upload.

4. The order fulfillment process of claim 1, further comprising producing a skin layout based on the CAD file and the production artwork.

5. The order fulfillment process of claim 4, further comprising cutting the substrate in accordance with specifications contained in the CAD file.

6. The order fulfillment process of claim 1, further comprising printing the skin layout onto a substrate.

7. An order fulfillment system for processing an order for a skin, comprising:
   management means for operationally controlling an order for a skin associated with a particular consumer device, the order placed from a remote customer site, the management means comprising:
   (i) means for determining if a CAD file associated with the particular consumer device does not exist and, if it is determined that the CAD file does not exist, generating the CAD file, and
   (ii) means for determining if production artwork does not exist for the CAD file and, if it is determined that the production artwork does not exist, generating the production artwork;
   means for printing a design on a substrate and cutting the substrate in accordance with the order; and
   shipping means for packing the skin and preparing shipping materials in accordance with the order.

8. The order fulfillment system of claim 7, further comprising manufacturing means for manufacturing the substrate.

9. An order fulfillment system for fulfilling a customized order for an adhesive cover, the system comprising:
   a computer having one or more processors; and
   a non-transitory computer-readable storage medium with executable program stored thereon, wherein the program instructs a microprocessor to perform steps comprising:
   receiving a customized order for an adhesive cover associated with a particular consumer device;
   determining if a CAD file associated with the particular consumer device does not exist and, if it is determined that the CAD file does not exist, generating the CAD file; and
   determining if production artwork does not exist for the CAD file and, if it is determined that the production artwork does not exist, generating the production artwork.

10. The order fulfillment system of claim 9, wherein the program instructs a microprocessor to perform the further step of determining if a user has requested an image upload and, if it is determined that the user has requested a image upload, then uploading an image provided by the user.

11. The order fulfillment system of claim 10, wherein the program instructs a microprocessor to perform the further step of producing a skin layout based on the CAD file and the image upload.

12. The order fulfillment system of claim 10, wherein the program instructs a microprocessor to perform the further step of cutting the substrate in accordance with specifications contained in the CAD file.

13. The order fulfillment system of claim 9, wherein the program instructs a microprocessor to perform the further step of producing a skin layout based on the CAD file and the production artwork.

14. The order fulfillment system of claim 11, wherein the program instructs a microprocessor to perform the further step of printing the skin layout onto a substrate.

* * * * *